United States Patent [19]
Ripstein

[11] 3,786,783
[45] Jan. 22, 1974

[54] FEED CONVEYING AND DISPENSING APPARATUS

[76] Inventor: Terryl J. Ripstein, 2478 Main St., Varysburg, N.Y. 14167

[22] Filed: July 12, 1972

[21] Appl. No.: 270,937

[52] U.S. Cl. ............................ 119/52 AF, 119/52 B
[51] Int. Cl. .............................................. A01k 5/00
[58] Field of Search..... 119/52 AF, 52 B, 51 CF, 53

[56] References Cited
UNITED STATES PATENTS

| | | | |
|---|---|---|---|
| 2,914,023 | 11/1959 | St. Pierre | 119/52 AF |
| 3,485,215 | 12/1969 | Scott et al. | 119/52 AF |
| 3,688,745 | 9/1972 | Stefan | 119/52 AF |
| 3,695,234 | 10/1972 | Buschbom et al. | 119/52 B |
| 3,547,082 | 12/1970 | Blessin et al. | 119/53 |

*Primary Examiner*—Louis G. Mancene
*Assistant Examiner*—J. N. Eskovitz
*Attorney, Agent, or Firm*—Conrad Christel et al.

[57] ABSTRACT

An endless trough is suspended in an elevated, generally horizontal plane above and slightly forward of the front ends of a plurality of stalls disposed in spaced-apart rows. A plurality of transversely extending paddles, carried by an endless drive chain, convey feed material through the trough. Openings are provided in the trough bottom wall for dispensing the feed material to livestock confined within the stalls. Slide gates are associated with the openings for selectively closing such openings or varying the sizes thereof.

4 Claims, 3 Drawing Figures

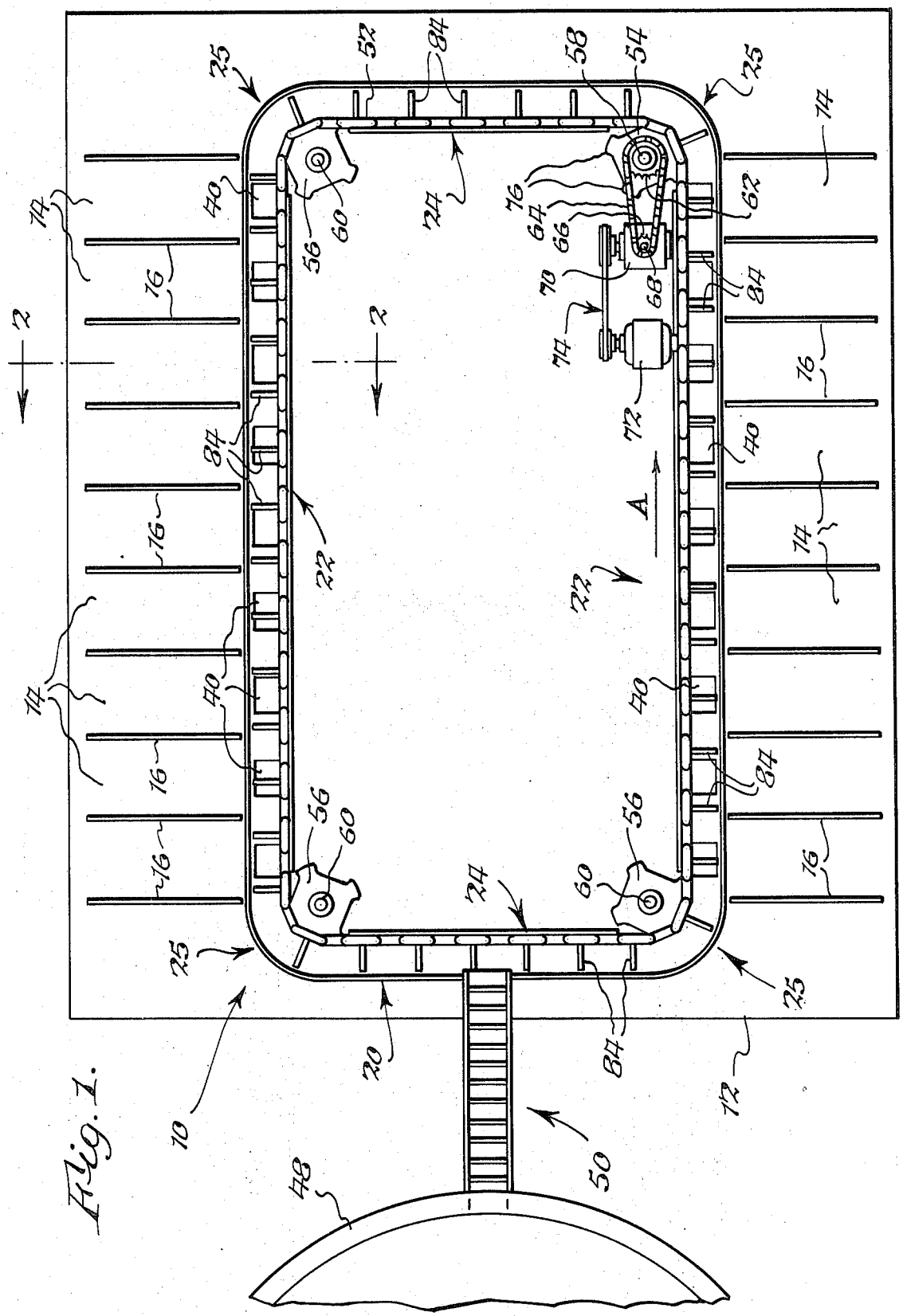

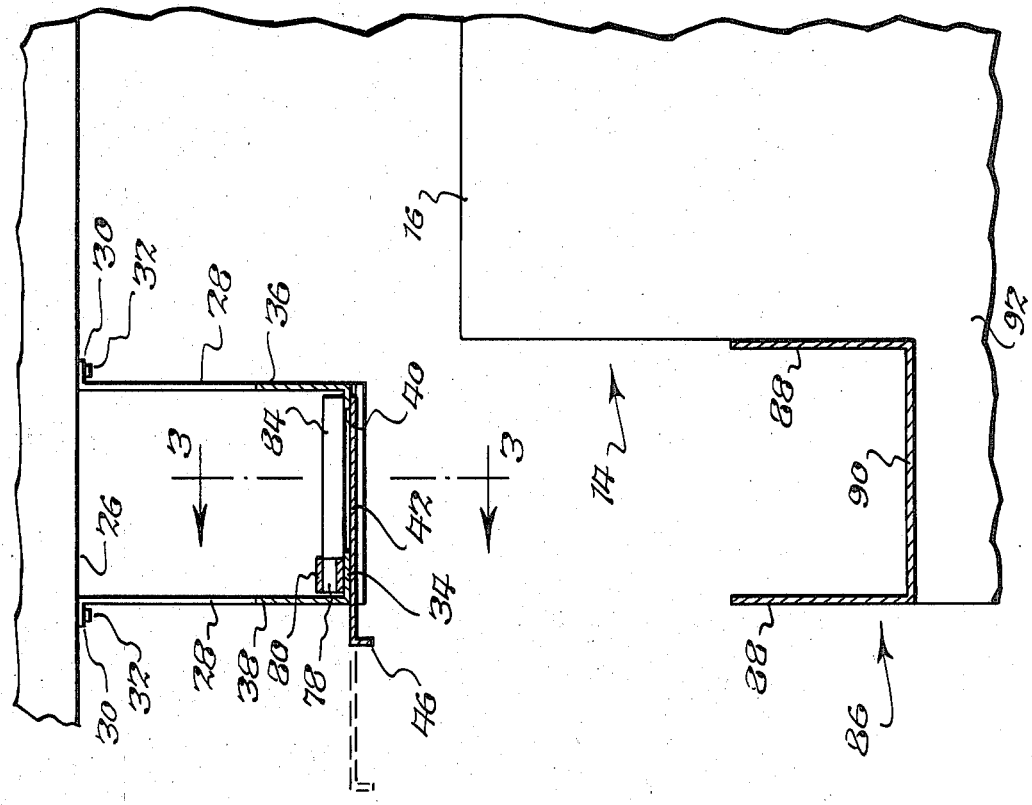
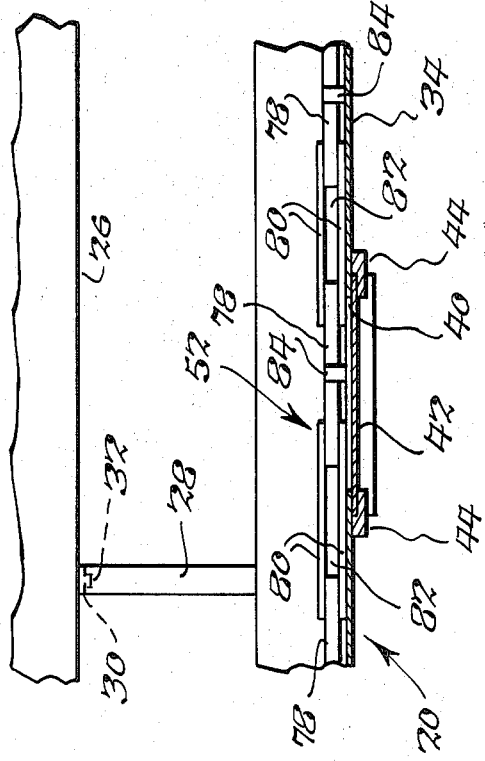

FEED CONVEYING AND DISPENSING APPARATUS

BACKGROUND OF THE INVENTION

This invention relates to a feed conveying and dispensing apparatus and, more particularly, to an improved feed conveying and dispensing apparatus for delivering feed directly to livestock confined within the stalls of a barn.

In livestock feeding operations, the utilization of automatic animal feeders has become widely accepted in recent years in an effort to eliminate the tedious and monotonous chores of hand carrying or hauling feed ensilage in buckets or other manually portable containers from the feed storage bin or silo to the numerous stalls in a barn. One conventional method of automatic feeding involves the use of augers for delivering feed from the silo to a feed trough. However, these auger-type conveyors tend to fragment a portion of the feed into small particles or "fines," which is less appetizing to the animals and often wasted. Also, these known automatic feeders generally convey the feed to feeding troughs, which requires the livestock to be herded and led to such common feeding troughs. This, of course, is time consuming and can be a nuisance to the farmer. Moreover, there is a tendency of livestock crowding at certain locations at the trough and "hogging" of the feed by boss animals. In some instances, the barn must be specially designed and arranged near the feed storage bin or silo for economic reasons.

SUMMARY OF THE INVENTION

Accordingly, it is a primary object of the present invention to provide an improved feed conveying and dispensing apparatus delivering feed to livestock confined within individual stalls in a barn.

It is another object of this invention to provide the foregoing apparatus with a conveyor system suspended above the livestock and having an endless orbital path in a horizontal plane insuring feed delivering to livestock confined within stalls located anywhere adjacent the periphery of the barn and enabling the feed input from the silo to be located anywhere about the periphery of the barn.

It is still another object of the present invention to provide the foregoing apparatus with means selectively dispensing feed from the conveyor to livestock housed within their stalls.

In one aspect thereof, the feed conveying and dispensing apparatus of the present invention is characterized by the provision of an endless trough suspended in an elevated, horizontal plane above the stalls in a barn. A plurality of longitudinally spaced, transversely extending paddles, carried by an endless drive chain, convey feed material through the trough. A plurality of longitudinally spaced openings are provided in the trough bottom wall for dispensing the feed material therethrough to lower areas in front of the stalls within reach of the livestock confined within the stalls. Slide gates are associated with the openings for selectively closing them or adjusting the sizes of such openings.

These and other objects, advantages and characterizing features of the present invention will become clearly apparent from the ensuing detailed description of an illustrative embodiment thereof, taken together with the accompanying drawings wherein like reference numerals denote like parts throughout the various views.

BRIEF DESCRIPTION OF THE DRAWINGS

FIG. 1 is a diagrammatic plan view of a feed conveying and dispensing system, constructed in accordance with this invention, installed in a barn for housing cattle;

FIG. 2 is a vertical, cross sectional view, on an enlarged scale, taken about on line 2—2 of FIG. 1; and FIG. 3 is a vertical, longitudinal sectional view, on an enlarged scale, taken about on line 3—3 of FIG. 2.

DETAILED DESCRIPTION OF AN ILLUSTRATIVE EMBODIMENT

Referring now in detail to the illustrative embodiment depicted in the drawings, there is shown in FIG. 1 a feed conveying and dispensing apparatus, generally designated 10, constructed in accordance with this invention, and shown mounted in a barn 12 having two rows of livestock pens or stalls 14 located along opposite sides of barn 12. Each stall 14 is defined by a pair of spaced partitions 16 separating adjacent animals in a well known manner. While the feed conveying and dispensing apparatus of this invention is especially adapted for delivering feed to cattle, it should be understood that the apparatus is in no way limited thereto, but has utility in any animal feed system.

As shown diagrammatically in FIG. 1, apparatus 10 includes a conveyor system comprising a suspended trough 20 disposed in a generally horizontal plane in substantial parallelism with the floor of the barn and having a generally rectangular outline in plan defined by two elongated, laterally spaced side portions 22 extending along the opposite rows of stalls 14, respectively, above and adjacent the front ends thereof. Trough 20 also includes a pair of end portions 24 joining the opposite ends of side portions 22 at curved junctures or corners 25 to provide a continuous, endless trough 20. While trough 20 preferably has a generally rectangular outline in plan, it should be appreciated that trough 20 can taken any continuous geometric configuration, as dictated by the shape of barn 12. Also, any number of stalls 14 can be provided about the entire periphery of trough 20, as desired. For example, stalls 14 may be installed along the peripheral end portions 24 of trough 20, if desired.

As shown in FIG. 2, trough 20 is suspended from the ceiling 26 of barn 12 in overlying, spaced relation to stalls 14 and slightly forwardly of the front, open ends thereof. Trough 20 is supported from ceiling 26 by a plurality of longitudinally spaced pairs of hangers 28 rigidly secured at their lower ends to the sidewalls of trough 20 and having outwardly bent flanges 30 at their upper ends releasably secured to ceiling 26 by suitable fasteners, such as bolts 32.

Trough 20 comprises a bottom wall 34 and a pair of side walls 36 and 38 forming a generally U-shaped configuration in cross section (FIG. 2). A plurality of longitudinally spaced openings 40 are provided in trough bottom wall 34 for discharging the feed material being conveyed along trough 20. Outer side wall 36 extends lengthwise of trough 20 and is continuous therewith whereas inner side wall 38 is interrupted at the corners 25 thereof to provide space for sprockets, hereinafter described. As shown in FIG. 1, an opening 40 is provided in front of each stall 14. However, openings 40 can be spaced in a manner locating them in front of every second parition 16 between adjacent stalls 14 to dispense feed to two adjacent animals confined therein, or disposed in any other spaced-apart relation, as desired.

Each opening 40 can be selectively closed by means of a slide gate 42 associated therewith. As shown in FIGS. 2 and 3, a pair of guide rails or tracks 44 are welded or otherwise fixedly secured to the underside of trough bottom wall 34 on opposite sides of each opening 40 to provide a pair of guide grooves for receiving the opposite sides of slide gate 42. Thus, slide gate 42 is horizontally reciprocable within the guide grooves to control the size of its associated opening 40 and thereby control the discharge flow of feed material from trough 20. Each slide gate 42 is provided with a depending lip 46, which serves as a handle or grip for manually actuating slide gate 42. If desired, slide gate 42 can be automatically actuated by means (not shown) operatively connected to a remote control station (not shown).

Livestock feed, such as hay, grain or silage is conveyed to trough 20 from a suitable storage source, such as a silo 48 (FIG. 1) by a conventional conveying means 50 tapped into silo 48 and extending through a suitable opening provided in the wall of barn 12. The conveying means 50 may be any well known arrangement, such as a power operated conveyor or a simple gravity feed chute, the trailing edge of such conveying means 50 leading to trough 20. An advantage residing in the rectangular path of trough 20 in a horizontal plane enables the silo 48 to be conveniently located anywhere about the periphery of bar 12, it being a relatively simple task to provide a suitable opening in the barn side walls for accommodating the conveying means 50.

Means are provided for conveying the feed material through trough 20 in a counterclockwise direction, as indicated by arrow A in FIG. 1, such means comprising an endless conveyor drive chain 52 trained about a drive sprocket 54 and idler sprockets 56 for movement in an endless orbital path in a horizontal plane along the inner side wall 38 of trough 20. Sprockets 54 and 56 are located at the inner corners 25 of trough 20 and are rotatable about vertical axes defined by a drive shaft 58 and vertical shafts 60, respectively. Drive shaft 58 is provided with a sprocket 62 driven by a drive clain 64 trained about a drive sprocket 66. Sprocket 66 is mounted on an output shaft 68 projecting outwardly fron a gear reduction mechanism 70, in turn, operatively connected to an electric motor 72 by means of a belt and pulley arrangement 74. Thus, motor 72 effects rotation of drive sprocket 54, the latter having teeth 76 projecting through the inter-rupted portion of inner side wall 38 and engageable with drive chain 52.

As shown in FIG. 3, drive chain 52 is provided with links 78 pivotally connected adjacent their opposite ends to outer connecting links 80. The spacing between adjacent ends of links 78 define openings 82 in which sprocket teeth 76 are engagable for driving endless chain 52 in its orbital path. An endless series of longitudinally spaced cross-flights or paddles 84 are carried by links 78 for conveying the feed material uniformly along trough 20. Paddles 84 extend transversely or cross-wise of trough 20 and carry the feed material therealong across openings 40.

As shown in FIG. 2, a continuous U-shaped manger or feed trough, generally designated 86, is provided directly below trough 20 and extends lengthwise thereof in a coextensive rectangular path. Trough 86 is located at a convenient level for easy access to the livestock while confined in their stalls 14 and comprises a pair of side walls 88 and a bottom wall 90, which may be supported on lower axial extensions 92 of partitions 16 or any other suitable support structure. However, it should be understood that trough 86 can be eliminated with the feed material deposited directly on the barn floor in close proximity to the front of each stall 14.

The present invention also contemplates the use of a hopper (not shown) for each opening 40, such hopper being rigidly secured to trough 20 and having an upper inlet end in registry with opening 40 and at least as large in cross sectional area as opening 40. The hopper can be provided with downwardly tapering side walls terminating in a restricted outlet opening which can be closed by means of a slide gate in a manner similar to the closing of opening 40. Thus, feed material can be delivered to these hoppers at any time convenient to the farmer and stored for subsequent use.

In operation, motor 72 is energized and, through the gear reduction means 70 and associated drive connections, effects rotation of drive sprocket 54 to move drive chain 52 in its endless path along the inner side wall 38 of trough 20. Feed material, such as hay, grain or silage, is delivered from silo 48 to trough 20 by conveying means 50. Prior to initiating the operation of drive chain 52, all slide gates 42 are extended to their open positions. Thus, the feed material is conveyed by paddles 84 along trough 20 in the counterclockwise direction of arrow A, as viewed in FIG. 1, and will be discharged through the first opening 40 into the continuous feed trough 86 or, in the absence of such a trough 86, onto the floor area in front of and closely adjacent the first stall 14. When sufficient feed is deposited at the first station, its associated opening 40 is closed by retracting slide gate 42 to a closed position, enabling the feed material to pass thereover to the second opening 40. Succeeding gate slides 42 are closed in turn as the required amount of feed material is dispensed through their associated openings 40 until the last opening 40 is closed upon retraction of its respective slide gate 42. It should be appreciated that gates 42 may be extended to any desired position between a fully opened position and a fully closed position to vary the sizes of openings 40, thereby metering the amount of feed material dispensed therethrough as dictated by the food requirements of the livestock being fed. Of course, only certain openings 40 may be selected at any one time to dispense the feed material, the others remaining closed by slide gate 42. When the previously mentioned hoppers for openings 40 are employed, these can be filled at any time convenient to the farmer, and the feed material stored therein until feeding time.

From the foregoing, it is apparent that the objects of the present invention have been fully accomplished. As a result of this invention, an improved feed conveying and dispensing apparatus is provided for delivering feed directly to livestock confined within stalls in a barn. By the provision of a suspended conveyor arrangement having an endless orbital path, the feed can be routed to be dispensed adjacent the front ends of a plurality of stalls disposed in spaced-apart rows.

A preferred embodiment of this invention having been described and illustrated in detail, it is to be understood that this has been done by way of ilustration only.

I claim:

1. Apparatus for feeding livestock confined within at least two rows of spaced-apart stalls enclosed within a barn comprising: an endless trough disposed in a generally horizontal plane within said barn and having portions extending along said rows barn the front ends of said stalls; rigid means suspending said trough from an overlying support structure mounted in said barn and above the level of the bottom of said stalls in substantial parallelism therewith; means supplying feed material from a source exteriorly of said bar to said trough; a powered, endless drive chain including longitudinally spaced paddles for conveying said feed material lengthwise of said trough; said trough comprising a bottom wall and a pair of side wall forming a generally U-shaped configuration in cross section; a plurality of longitudinally spaced openings in said bottom wall for dispensing said feed material; slide gates mounted on said trough bottom wall below said openings, respectively, for reciprocable movement relative to said openings for controlling the size of said openings; and a pair of spaced brackets mounted on the underside of said trough bottom wall adjacent each opening and having grooves for receiving the opposite sides of the associated slide gate.

2. Apparatus according to claim 1 wherein said rigid suspending means comprises a plurality of hangers secured at the lower ends thereof to said trough side walls and connected at the upper ends thereof to an overlying support structure.

3. Apparatus for feeding livestock confined within the least two rows of spaced-apart stalls comprising: an endless trough disposed in a generally horizontal plane and having portions extending along said rows adjacent the front ends of said stalls; rigid means suspending said trough above the level of the bottom of said stalls in a substantiall parallelism therewith; means supplying feed material from a source to said trough; means including longitudinally spaced paddles for conveying said feed material lengthwise of said trough; a continuous feeding trough disposed beneath said endless trough in spaced, substantially parallel relation thereto and coextensive therewith; means supporting said continuous feeding trough above the level of the bottom of said stalls; and means selectively dispensing said feed material from said endless trough to said continuous feeding trough in front of said stalls within reach of the livestock confined therein.

4. Apparatus according to claim 3 wherein said rigid suspending means comprises a plurality of hangers secured at the lower ends thereof to said endless trough and connected at the upper ends thereof to an overlying support structure forming a part of a barn construction; said dispensing means comprising a plurality of longitudinally spaced openings in said bottom wall and slide gates mounted on said endless trough for reciprocable movement transversely of said trough for controlling the sizes of said openings, respectively.

* * * * *